United States Patent
Yoshizaki et al.

(10) Patent No.: US 10,302,012 B2
(45) Date of Patent: May 28, 2019

(54) VARIABLE NOZZLE UNIT AND VARIABLE GEOMETRY SYSTEM TURBOCHARGER

(71) Applicant: IHI Corporation, Koto-ku (JP)

(72) Inventors: Taiki Yoshizaki, Tokyo (JP); Koutarou Itou, Tokyo (JP)

(73) Assignee: IHI Corporation, Koto-ku (JP)

( * ) Notice: Subject to any disclaimer, the term of this patent is extended or adjusted under 35 U.S.C. 154(b) by 201 days.

(21) Appl. No.: 15/415,157

(22) Filed: Jan. 25, 2017

(65) Prior Publication Data

US 2017/0130646 A1 May 11, 2017

Related U.S. Application Data

(63) Continuation of application No. PCT/JP2015/070571, filed on Jul. 17, 2015.

(30) Foreign Application Priority Data

Sep. 12, 2014 (JP) .................. 2014-186033

(51) Int. Cl.
F02B 37/24 (2006.01)
F01D 17/16 (2006.01)

(52) U.S. Cl.
CPC ............ *F02B 37/24* (2013.01); *F01D 17/165* (2013.01); *F05D 2220/40* (2013.01); *Y02T 10/144* (2013.01)

(58) Field of Classification Search
CPC .......... F02B 37/24; F01D 17/165; F01D 1/04; F01D 1/06; F01D 17/16; F01D 17/162; F04D 19/022
USPC ............. 60/602; 415/148, 191, 208.1–208.4, 415/159–165
See application file for complete search history.

(56) References Cited

U.S. PATENT DOCUMENTS

| | | | | |
|---|---|---|---|---|
| 7,322,791 B2 * | 1/2008 | Stilgenbauer | ......... | F01D 17/165 60/602 |
| 7,393,179 B1 * | 7/2008 | Kesseli | ................. | F01D 17/165 415/164 |
| 7,509,804 B2 * | 3/2009 | Kobayashi | ............ | F01D 17/165 60/602 |

(Continued)

FOREIGN PATENT DOCUMENTS

| | | |
|---|---|---|
| CN | 101978137 A | 2/2011 |
| CN | 104018936 A | 9/2014 |

(Continued)

OTHER PUBLICATIONS

Combined Chinese Office Action and Search Report dated Jul. 3, 2018 in Patent Application No. 201580047953.6 (with English Translation of Categories of Cited Documents).

(Continued)

*Primary Examiner* — Thai Ba Trieu
(74) *Attorney, Agent, or Firm* — Oblon, McClelland, Maier & Neustadt, L.L.P.

(57) ABSTRACT

A plurality of variable nozzles is provided at equal intervals in a circumferential direction so as to surround a turbine wheel between a facing surface of a first nozzle ring and a facing surface of a second nozzle ring. The first nozzle ring is constituted by three nozzle ring segments laminated along the axial direction. In the three nozzle ring segments, a thickness of the nozzle ring segment on a side far from the bearing housing is smaller than a thickness of the nozzle ring segment on a side close to the bearing housing.

11 Claims, 7 Drawing Sheets

(56) References Cited

U.S. PATENT DOCUMENTS

| | | | |
|---|---|---|---|
| 9,664,060 B2 | 5/2017 | Inoue et al. | |
| 2006/0188368 A1 | 8/2006 | Jinnai et al. | |
| 2010/0209232 A1 | 8/2010 | Stein et al. | |
| 2011/0014032 A1 | 1/2011 | Boening et al. | |
| 2011/0038742 A1* | 2/2011 | Fleig | F01D 17/165 417/406 |
| 2013/0170976 A1 | 7/2013 | Ramb et al. | |
| 2014/0178181 A1* | 6/2014 | Tashiro | F01D 17/165 415/148 |
| 2014/0248137 A1* | 9/2014 | Inoue | F01D 17/165 415/159 |
| 2014/0334918 A1* | 11/2014 | Ueda | F01D 17/165 415/159 |
| 2017/0058764 A1* | 3/2017 | Bayod | F02B 37/24 |
| 2017/0082018 A1* | 3/2017 | Bayod | F02B 37/22 |
| 2017/0298813 A1* | 10/2017 | Ikeda | F02B 37/24 |

FOREIGN PATENT DOCUMENTS

| | | |
|---|---|---|
| JP | 2006-220053 | 8/2006 |
| JP | 2007-205310 | 8/2007 |
| JP | 2009-243300 | 10/2009 |
| JP | 2009-243431 | 10/2009 |
| JP | 2011-515608 | 5/2011 |
| JP | 2013-130116 | 7/2013 |
| JP | 2013-537957 | 10/2013 |
| JP | 2013-253519 | 12/2013 |

OTHER PUBLICATIONS

International Search Report dated Oct. 6, 2015 in PCT/JP2015/070571, filed on Jul. 17, 2015 ( with English translation).

Written Opinion dated Oct. 6, 2015 in PCT/JP2015/070571, filed on Jul. 17, 2015.

* cited by examiner

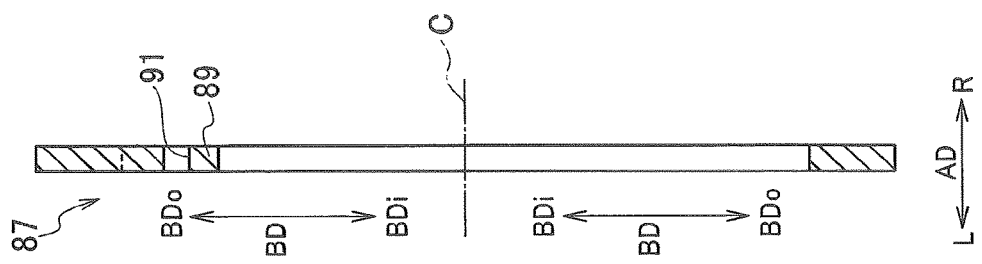
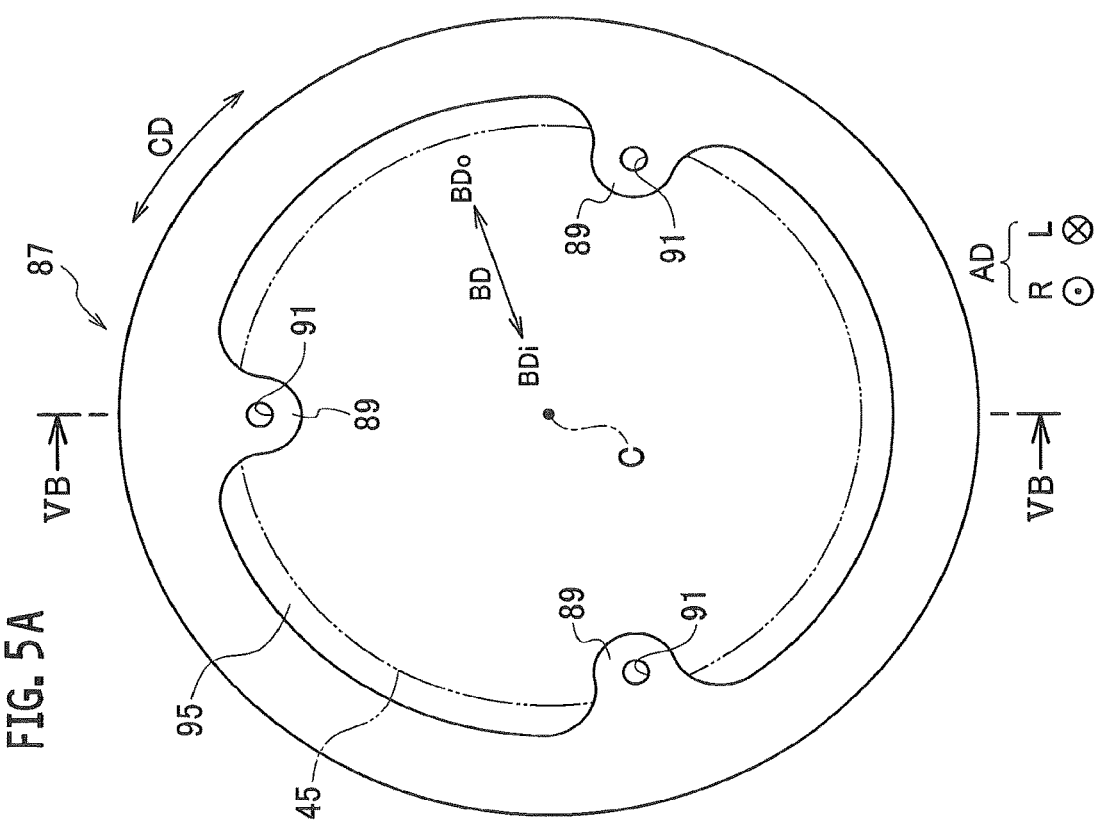

VARIABLE NOZZLE UNIT AND VARIABLE GEOMETRY SYSTEM TURBOCHARGER

CROSS REFERENCE TO RELATED APPLICATIONS

This application is a continuation application of International Application No. PCT/JP2015/070571, filed on Jul. 17, 2015, which claims priority to Japanese Patent Application No. 2014-186033, filed on Sep. 12, 2014, the entire contents of which are incorporated by reference herein.

BACKGROUND

1. Technical Field

The present disclosure relates to a variable nozzle unit which adjusts a passage area (flow rate) of an exhaust gas to be supplied to a turbine wheel side in a variable geometry system (VGS) turbocharger and a variable geometry system turbocharger.

2. Description of the Related Art

The variable geometry system turbocharger is a turbocharger having a variable nozzle unit installed in a turbine housing. In recent years, various kinds of development have been made for this variable nozzle unit (refer to Japanese Patent Application Laid-Open Publication Nos. 2009-243431 (Patent Literature 1) and 2009-243300 (Patent Literature 2)).

The conventional variable nozzle unit includes a first nozzle ring as an annular first wall member and a second nozzle ring as an annular second wall member, installed in the turbine housing. The first nozzle ring is provided concentrically with the turbine wheel. Furthermore, the second nozzle ring is provided at a position separated in an axial direction (an axial direction of the turbine wheel) with respect to the first nozzle ring. The second nozzle ring is provided integrally with the first nozzle ring by a plurality of connecting pins aligned at intervals in a circumferential direction (a predetermined circumferential direction).

The first nozzle ring has a surface (a facing surface) facing the second nozzle ring. The second nozzle ring has a surface (a facing surface) facing the first nozzle ring. A plurality of variable nozzles is provided between these facing surfaces. The variable nozzles are provided at equal intervals in the circumferential direction (the predetermined circumferential direction). Each of the variable nozzles is rotatable in a forward direction and in a reverse direction (an opening direction and a closing direction) around a shaft core parallel to a shaft core of the turbine wheel. Furthermore, a link chamber is defined on a surface side opposite to the facing surface of the first nozzle ring. A link mechanism is provided in the link chamber. The link mechanism synchronously rotates the plurality of variable nozzles in the forward direction or in the reverse direction. When the plurality of variable nozzles is synchronously rotated in the forward direction (opening direction), the passage area (throat area) of the exhaust gas supplied to the turbine wheel side becomes larger. When the plurality of variable nozzles is synchronously rotated in the reverse direction (closing direction), the passage area of the exhaust gas becomes smaller.

A support ring is provided on the surface side opposite to the facing surface of the first nozzle ring. An outer diameter of the support ring is larger than an outer diameter of the first nozzle ring. An inner edge portion of the support ring is connected to one end portions of the plurality of connecting pins connecting the first nozzle ring and the second nozzle ring. Accordingly, the support ring is connected integrally to the first nozzle ring and the second nozzle ring. An outer edge portion of the support ring is attached to a bearing housing in a state of being sandwiched by the bearing housing and the turbine housing.

SUMMARY

Incidentally, during a normal operation of the variable geometry system turbocharger, a temperature of a portion on a side far from the bearing housing in the first nozzle ring is high, whereas a temperature of a portion on a side close to the bearing housing in the first nozzle ring is low. Namely, during the normal operation of the variable geometry system turbocharger, the first nozzle ring has a non-uniform temperature distribution along the axial direction. In addition, when a temperature difference between the portion on the side far from the bearing housing and the portion on the side close thereto in the first nozzle ring becomes large, free thermal expansion of the first nozzle ring in a radial direction is prevented, and the first nozzle ring is thermally deformed so that the facing surface of the first nozzle ring is inclined to a direction perpendicular to the axial direction. Then, depending on an operation situation of the variable geometry system turbocharger, a degree of parallelism between the facing surface of the first nozzle ring and the facing surface of the second nozzle ring is lowered, and there is a concern that a clearance between the facing surface of the first nozzle ring and the facing surface of the second nozzle ring becomes locally small.

Accordingly, in the conventional variable nozzle unit, a size of a nozzle-side clearance is set so that operational stability of the plurality of variable nozzles is maintained and reliability of the variable nozzle units, in other words, reliability of the variable geometry system turbocharger can be ensured. On the other hand, when the nozzle-side clearance is set larger, a leakage flow of the exhaust gas from the nozzle-side clearance increases, and thus turbine efficiency of the variable geometry system turbocharger tends to be easily lowered. Note that the nozzle-side clearance refers to a clearance between the facing surface of the first nozzle ring and a side surface (a side surface on one side in the axial direction) of the variable nozzle facing the facing surface or to a clearance between the facing surface of the second nozzle ring and a side surface (a side surface on the other side in the axial direction) of the variable nozzle facing the facing surface.

That is, there is a problem that it is difficult to maintain or enhance the turbine efficiency of the variable geometry system turbocharger while ensuring reliability of the variable geometry system turbocharger.

A first aspect of the present disclosure is a variable nozzle unit that adjusts a passage area of an exhaust gas to be supplied to a turbine wheel side in a variable geometry system turbocharger, the unit including: an annular first wall member provided concentrically with the turbine wheel in a turbine housing in the variable geometry system turbocharger; an annular second wall member provided integrally with the first wall member by a plurality of connecting pins aligned at intervals in a circumferential direction at a position separated from and facing the first wall member in an axial direction; a plurality of variable nozzles provided at intervals in the circumferential direction between a facing surface of the first wall member and a facing surface of the second wall member and rotatable in a forward-reverse direction around a shaft core parallel to a shaft core of the turbine wheel; a link mechanism for synchronously rotating a plurality of the variable nozzles; and a support ring integrally connected to the first wall member by connecting one end portions of a plurality of the connecting pins, wherein the first wall member is constituted by a plurality of wall member segments laminated along the axial direction.

Note that, in the present application, the term "to be provided" has a meaning including being indirectly provided via another member in addition to being directly provided. The term "to be provided" has a meaning including being indirectly provided via another member in addition to being directly provided. In addition, the terms an "annular first wall member" and an "annular second wall member" may constitute a part of the turbine housing or the like. Additionally, the term an "axial direction" refers to an axial direction of the turbine wheel (in other words, axial directions of the first wall member, the second wall member, and the support ring) unless otherwise specified. The phrase "to be laminated along the axial direction" has a meaning including a case of being inclined with respect to the axial direction in addition to a case where a laminating direction of the first wall member is parallel to the axial direction. Furthermore, the term "connection" has a meaning including connection by swaging, welding, a screw and the like. The term "radial direction" refers to a radial direction of the turbine wheel (in other words, radial directions of the first wall member, the second wall member, and the support ring) unless otherwise specified.

A second aspect of the present disclosure is a variable geometry system turbocharger that supercharges air to be supplied to a side of an engine by utilizing energy of an exhaust gas from the engine and that includes the variable nozzle unit according to the first aspect.

According to the present disclosure, thermal deformation of the first wall member can be suppressed during the normal operation of the variable geometry system turbocharger. Accordingly, the nozzle-side clearance can be made as small as possible. Therefore, according to the present disclosure, a leakage flow from the nozzle-side clearance can be reduced while operational stability of the plurality of variable nozzles is maintained and reliability of the variable nozzle unit, in other words, reliability of the variable geometry system turbocharger is ensured; and turbine efficiency of the variable geometry system turbocharger can be maintained or enhanced.

BRIEF DESCRIPTION OF THE DRAWINGS

FIG. 5A is a diagram illustrating a support ring in the variable nozzle unit according to the embodiment of the present disclosure and FIG. 5B is a cross-sectional diagram along a VB-VB line in FIG. 5A.

DESCRIPTION OF THE EMBODIMENTS

Figure 1:
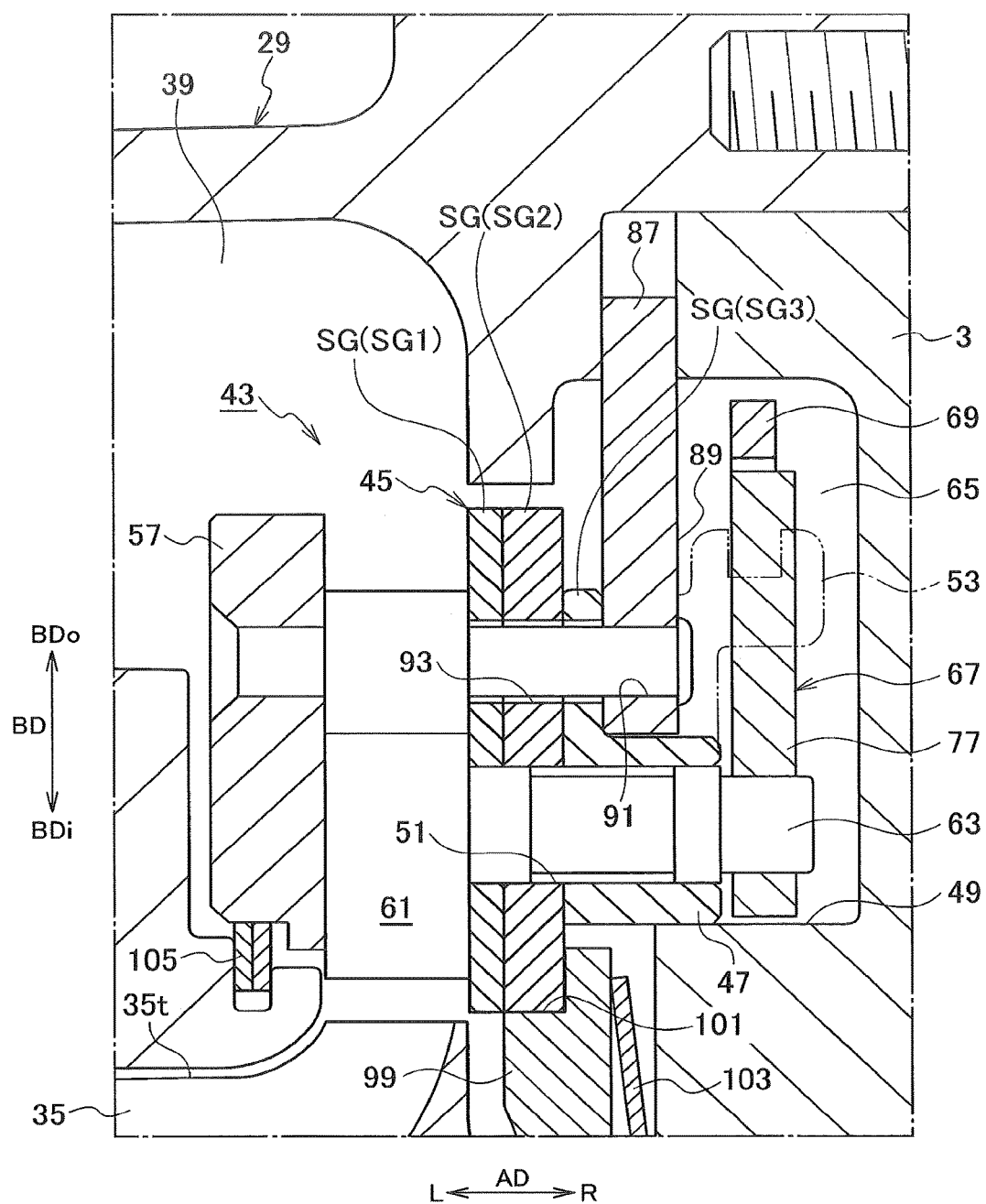
FIG. 1 is an enlarged cross-sectional diagram of an arrow view portion I in FIG. 2.

An embodiment and an example of the present disclosure will be described by referring to FIGS. 1 to 7. Note that, as illustrated in the drawings, "L" denotes a left direction, "R" denotes a right direction, "AD" denotes an axial direction, "BD" denotes a radial direction, "BDi" denotes an inner side in the radial direction, "BDo" denotes an outer side in the radial direction, and "CD" denotes a circumferential direction, respectively.

Figure 6:
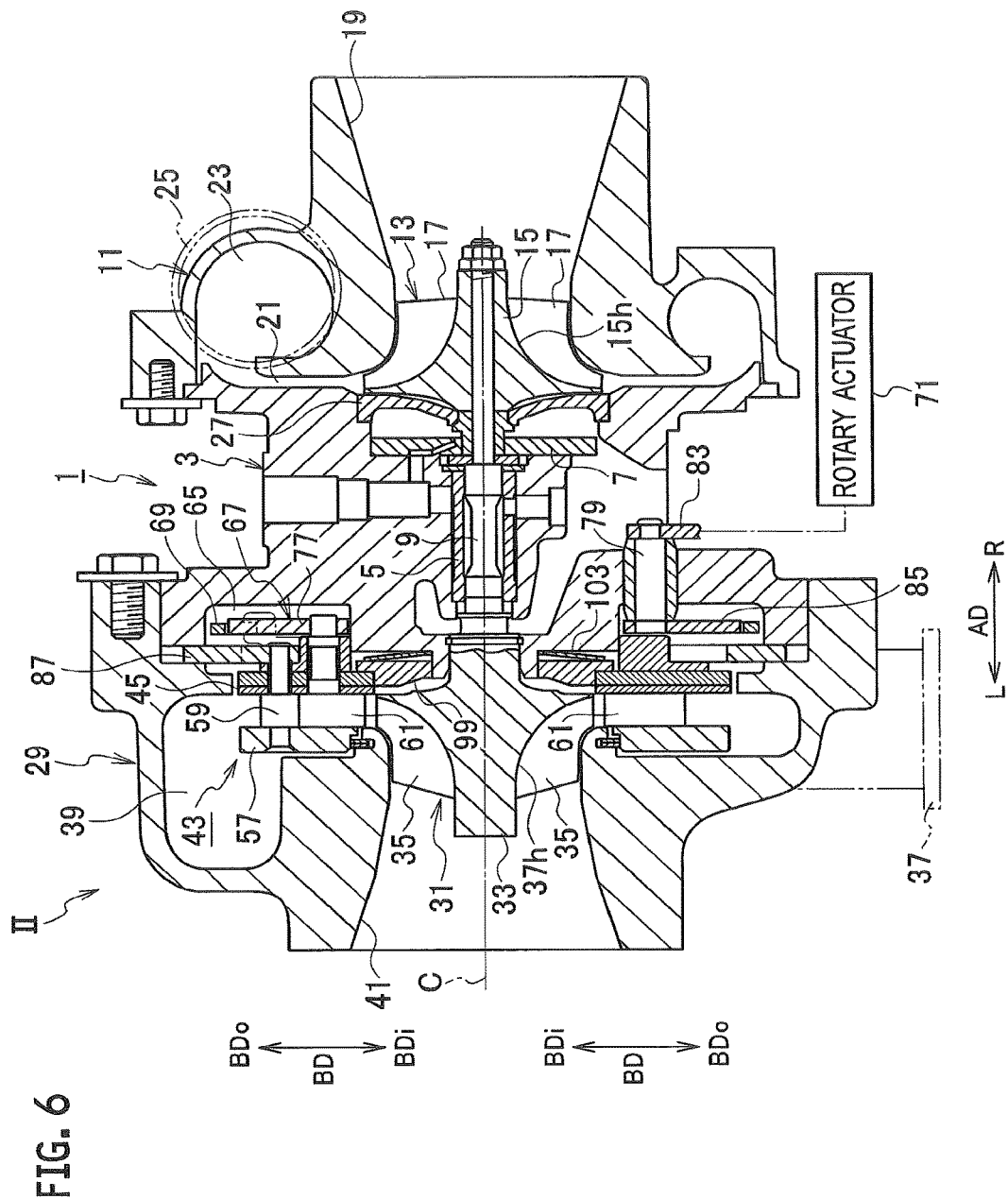
FIG. 6 is a front cross-sectional diagram of a variable geometry system turbocharger according to the embodiment of the present disclosure.

As illustrated in FIG. 6, a turbocharger 1 according to this embodiment supercharges (compresses) air to be supplied to an engine by utilizing pressure energy of the exhaust gas from the engine (not shown). As described below, the turbocharger 1 is a so-called variable geometry system turbocharger including a variable nozzle unit 43.

The turbocharger 1 includes a bearing housing 3. A pair of radial bearings 5 and a pair of thrust bearings 7 are provided in the bearing housing 3. In addition, a rotor shaft (turbine shaft) 9 extending in a right-and-left direction is rotatably provided on the plurality of bearings 5 and 7. In other words, the rotor shaft 9 is rotatably provided via the plurality of bearings 5 and 7, on the bearing housing 3.

A compressor housing 11 is provided on a right side of the bearing housing 3. A compressor wheel 13 is provided in the compressor housing 11. The compressor wheel 13 is rotatable around a shaft core C of the compressor wheel 13 and compresses the air by utilizing a centrifugal force during rotation. The compressor wheel 13 is connected integrally to a right end portion of the rotor shaft 9. Furthermore, the compressor wheel 13 includes a compressor disk 15. A hub surface 15h of the compressor disk 15 extends to an outer side in a radial direction of the compressor wheel 13 from the right side of the compressor wheel 13. Furthermore, a plurality of compressor blades 17 is integrally formed on the hub surface 15h of the compressor disk 15. The compressor blades 17 are provided at intervals in a circumferential direction (a circumferential direction of the hub surface 15h of the compressor disk 15) of the compressor wheel 13.

An air inlet 19 for taking in the air into the compressor housing 11 is formed on an inlet side (an upstream side when seen from a main stream direction of the air) of the compressor wheel 13 in the compressor housing 11. The air inlet 19 is connected to an air cleaner (not shown) for purifying the air. Furthermore, a diffuser channel 21 is formed on an outlet side (a downstream side when seen from the main stream direction of the air) of the compressor wheel 13 between the bearing housing 3 and the compressor housing 11. The diffuser channel 21 is annularly formed and boosts a pressure of the compressed air. Moreover, a compressor scroll channel 23 is formed inside the compressor housing 11. The compressor scroll channel 23 is formed in a spiral state and communicates with the diffuser channel 21. In addition, an air discharge port 25 is formed at an appropriate position of the compressor housing 11. The air discharge port 25 discharges the compressed air to the outer side of the compressor housing 11. The air discharge port 25 is connected to an intake manifold (not shown) of the engine.

Note that a seal plate 27 is provided on a right side portion of the bearing housing 3. The seal plate 27 is annularly formed and suppresses leakage of the compressed air to the thrust bearing 7 side.

Figure 2:
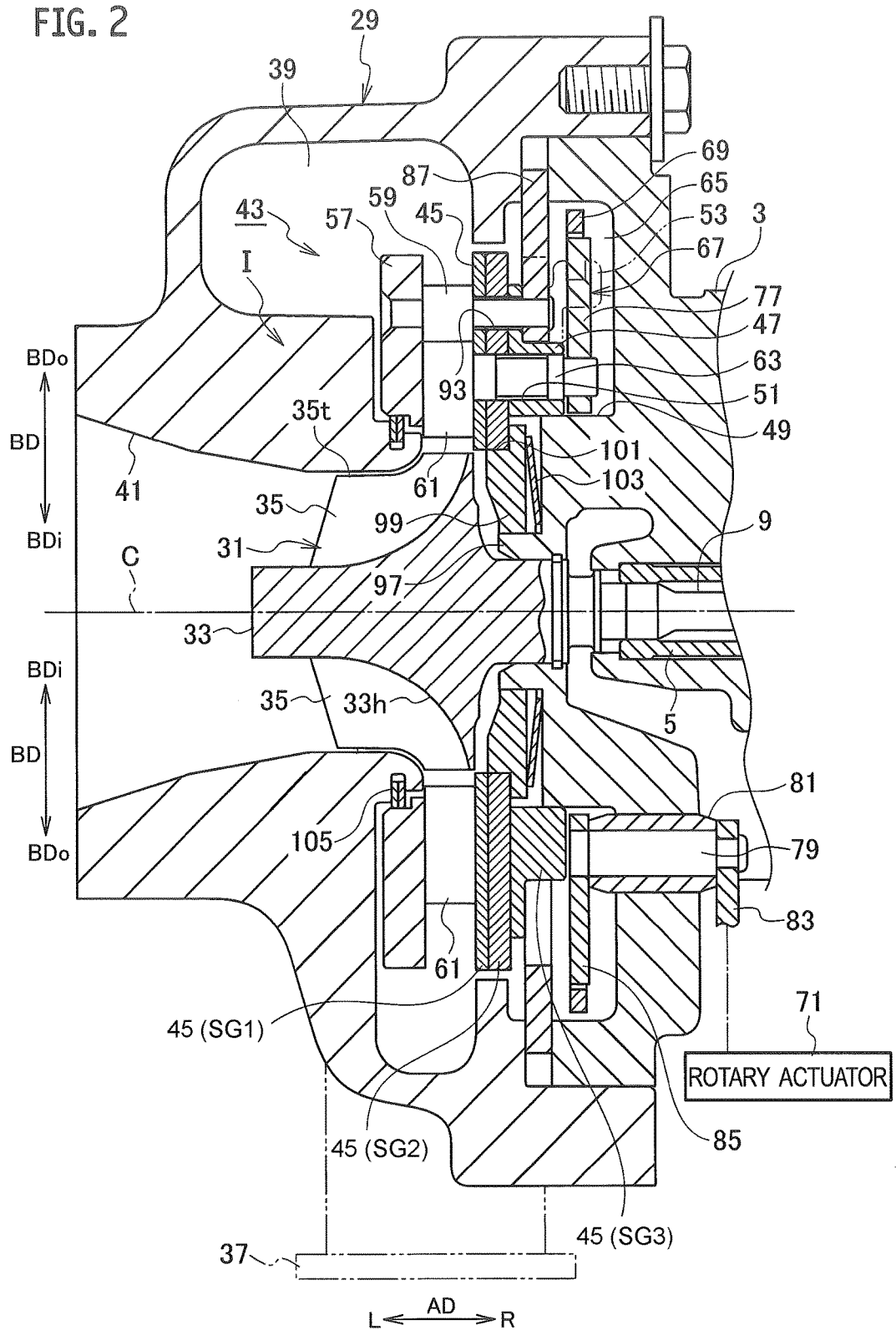
FIG. 2 is an enlarged cross-sectional diagram of an arrow view portion II in FIG. 6.
Figure 3B:
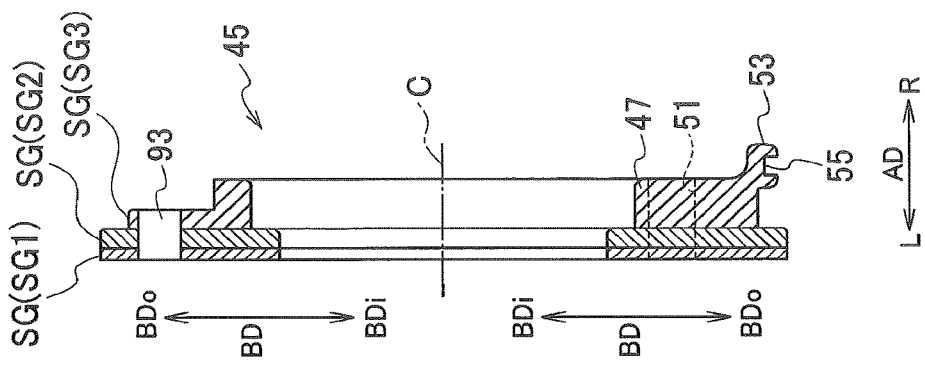
FIG. 3B is a cross-sectional diagram along a IIIB-IIIB line in FIG. 3A.
Figure 3A:
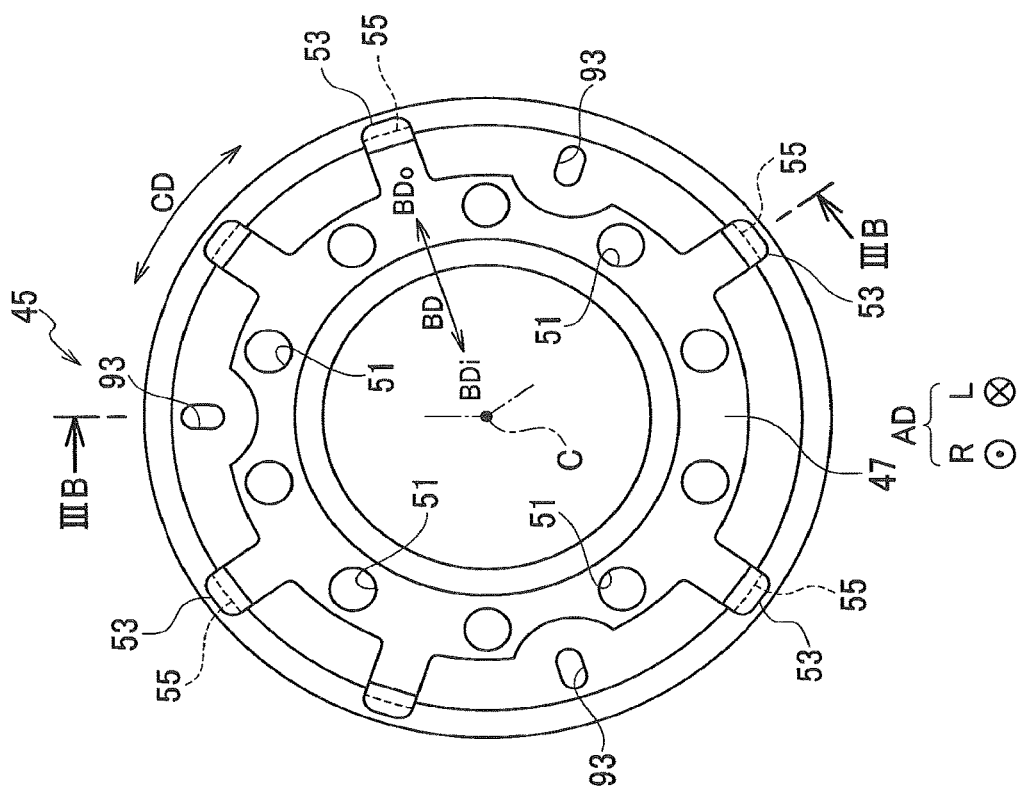
FIG. 3A is a diagram illustrating a first nozzle ring in a variable nozzle unit according to an embodiment of the present disclosure.

As illustrated in FIGS. 2 and 6, a turbine housing 29 is provided on a left side of the bearing housing 3. In addition, a turbine wheel 31 is provided in the turbine housing 29. The turbine wheel 31 is rotatable around the shaft core C of the turbine wheel 31 and generates a rotating force by utilizing pressure energy of the exhaust gas. The turbine wheel 31 is connected integrally to a left end portion of the rotor shaft 9. In addition, the turbine wheel 31 includes a turbine disk 33. A hub surface 33h of the turbine disk 33 extends to an outer side of the turbine wheel 31 in a radial direction from the left side (one side in the axial direction) of the turbine wheel 31. Furthermore, a plurality of turbine blades 35 is integrally formed on the hub surface 33h of the turbine disk 33. The turbine blades 35 are provided at intervals in the circumferential direction (the circumferential direction of the hub surface 33h of the turbine disk 33) of the turbine wheel 31.

A gas inlet 37 for taking the exhaust gas into the turbine housing 29 is formed at an appropriate position of the turbine housing 29. The gas inlet 37 is connected to an exhaust manifold (not shown) of the engine. In addition, a turbine scroll channel 39 is formed on an inlet side (an upstream side when seen from a main stream direction of the exhaust gas) of the turbine wheel 31 inside the turbine housing 29. The turbine scroll channel 39 is formed in a spiral shape and communicates with the gas inlet 37. Additionally, a gas discharge port 41 for discharging the exhaust gas is formed on an outlet side (a downstream side when seen from a flow direction of the exhaust gas) of the turbine wheel 31 in the turbine housing 29. The gas discharge port 41 is connected to a catalyst (not shown) via a connecting pipe (not shown).

The turbocharger 1 is equipped with a variable nozzle unit 43 that adjusts (that makes variable) a passage area (flow rate) of the exhaust gas to be supplied to the turbine wheel 31 side.

As illustrated in FIGS. 1, 2, 3A and 3B, a first nozzle ring 45 as a first wall member is provided in the turbine housing 29. The first nozzle ring 45 is annularly formed and is provided concentrically with the turbine wheel 31. In addition, a fitting protruding portion 47 is formed on a right side surface of the first nozzle ring 45. The fitting protruding portion 47 is annularly formed and protrudes to a right direction (toward the bearing housing 3). The fitting protruding portion 47 is supported by a supporting portion 49 by being fitted to the annular supporting portion 49 formed on a left side surface (a side surface facing the turbine housing 29) of the bearing housing 3. As, for example, illustrated in FIG. 2, the supporting portion 49 protrudes to the left direction (toward the turbine housing 29), is inserted into a hole formed by an inner circumferential surface of the fitting protruding portion 47 and is fitted to the fitting protruding portion 47. Additionally, a plurality of support holes 51 is formed in the first nozzle ring 45. The support holes 51 are formed at equal intervals in the circumferential direction and penetrate the first nozzle ring 45. Furthermore, a plurality of guide claws 53 is formed in the fitting protruding portion 47 of the first nozzle ring 45. The guide claws 53 are formed at intervals in the circumferential direction (predetermined circumferential direction). Moreover, each of the guide claws 53 has a guide groove 55 having a U-shaped section on a distal end side (outer side in the radial direction).

Figure 4:
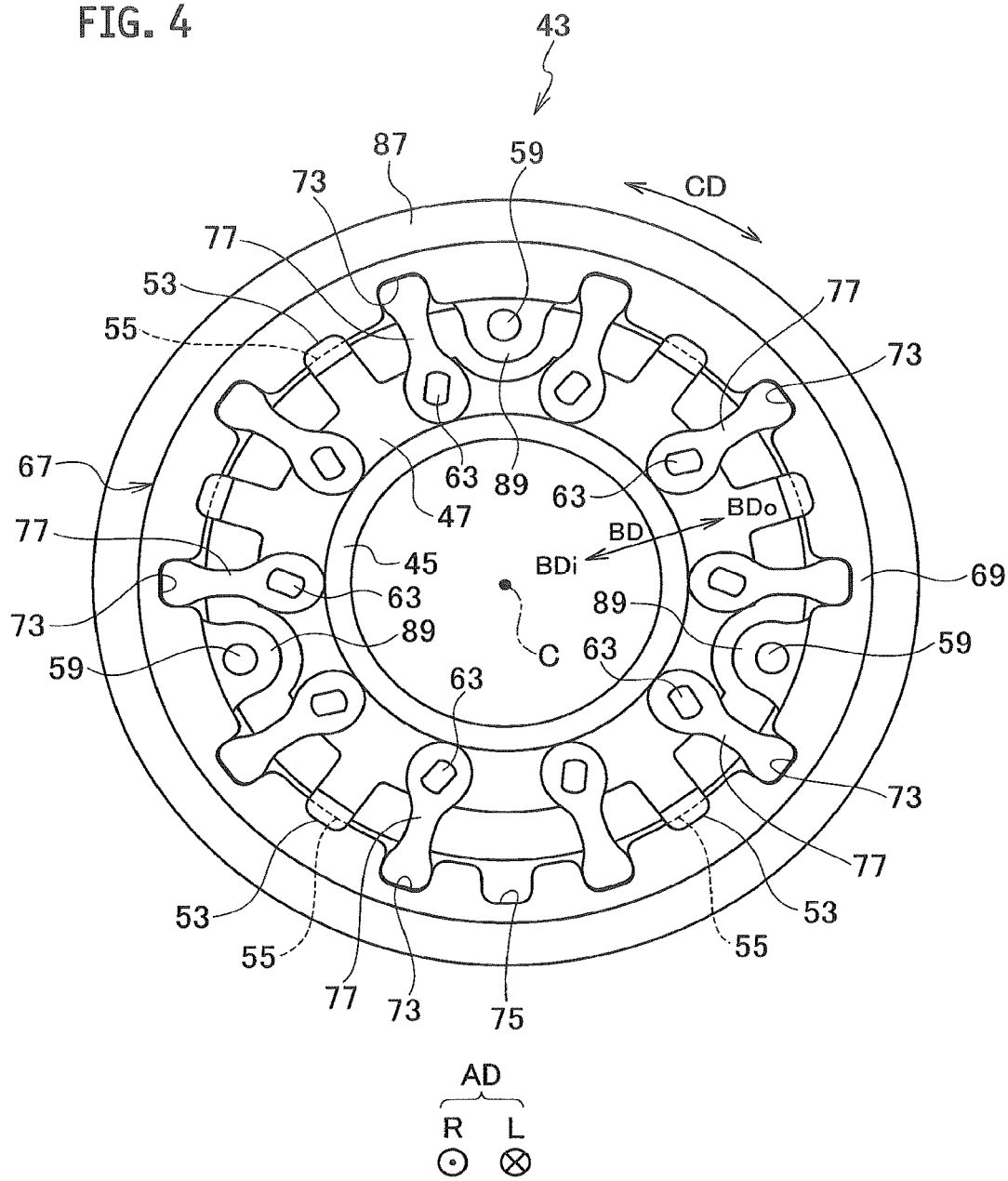
FIG. 4 is a diagram of the variable nozzle unit according to the embodiment of the present disclosure when seen from a link mechanism side.

As illustrated in FIGS. 1, 2, and 4, a second nozzle ring 57 as an annular second wall member is provided at a position separated from and facing the first nozzle ring 45 in the right-and-left direction (the axial direction of the turbine wheel 31). The second nozzle ring 57 is provided integrally with and concentrically with the first nozzle ring 45 via a plurality of (three or more) connecting pins 59 aligned in a predetermined circumferential direction. Here, the plurality of connecting pins 59 has a structure of setting the interval between the facing surface (left side surface) of the first nozzle ring 45 and the facing surface (right side surface) of the second nozzle ring 57. Note that, as illustrated in the aforementioned Patent Literature 1 and Patent Literature 2, the second nozzle ring 57 may have a cylindrical shroud portion (not shown) that covers tips 35t of the plurality of turbine blades 35.

As illustrated in FIGS. 1 and 2, the first nozzle ring 45 has a surface (facing surface) facing the second nozzle ring 57. The second nozzle ring 57 has a surface (facing surface) facing the first nozzle ring 45. A plurality of variable nozzles 61 is provided between these facing surfaces. The variable nozzles 61 are provided at equal intervals in the predetermined circumferential direction so as to surround the turbine wheel 31. Each of the variable nozzles 61 is rotatable in a forward direction and in a reverse direction (an opening direction and a closing direction) around a shaft core parallel to the shaft core C of the turbine wheel 31. Furthermore, a nozzle shaft 63 is integrally formed on a right side surface (a side surface on one side in the axial direction, a side surface facing the first nozzle ring 45) of each of the variable nozzles 61. Each of the nozzle shafts 63 is rotatably supported by the corresponding support hole 51 of the first nozzle ring 45. Note that an interval between the plurality of variable nozzles 61 in the circumferential direction may or may not be equal. Each of the variable nozzles 61 may have a second nozzle shaft (not shown) integrally formed on its left side surface (a side surface on the other side in the axial direction, a side surface facing the second nozzle ring 57). In this case, the second nozzle ring 57 has a support hole (not shown) that rotatably supports the second nozzle shaft.

An annular link chamber 65 is defined on a surface side (right side surface side) opposite to the facing surface of the first nozzle ring 45. A link mechanism 67 is provided in the link chamber 65. The link mechanism 67 synchronously rotates the plurality of variable nozzles 61 in the forward direction or in the reverse direction (the opening direction or the closing direction).

As illustrated in FIGS. 1, 2, and 4, in the guide groove 55 of each of the guide claws 53, a driving ring 69 is rotatably provided in the forward direction and in the reverse direction around the shaft core (the shaft core of the first nozzle ring 45) C of the turbine wheel 31. The driving ring 69 rotates in the forward direction or in the reverse direction by driving of a rotary actuator 71 such as an electric motor or a diaphragm actuator. A plurality (in the same number as that of the variable nozzles 61) of engaging concave portions (engaging portions) 73 is formed in the driving ring 69. The engaging concave portions 73 are provided at equal intervals in the circumferential direction (the circumferential direction of the driving ring 69) and each of them is dented to the outer side in the radial direction. Another engaging concave portion (engaging portion) 75 is formed at an appropriate position of the driving ring 69. Similarly to the engaging concave portion 73, the engaging concave portion 75 is also dented to the outer side in the radial direction. Furthermore, a base portion of a nozzle link member 77 is integrally connected to the nozzle shaft 63 of each of the variable nozzles 61. A distal end portion of each of the nozzle link members 77 is engaged with the corresponding engaging concave portion 73 of the driving ring 69. Note that, in this embodiment, the driving ring 69 is rotatably provided in the forward direction and in the reverse direction in the guide grooves 55 of the plurality of guide claws 53. However, instead, as illustrated in Patent Literature 1 and Patent Literature 2, the driving ring 69 may be rotatably provided in the forward direction and in the reverse direction on a guide ring (not shown) provided on a surface opposite to the facing surface of the first nozzle ring 45. Moreover, in this embodiment, the link mechanism 67 is provided on the side of the surface opposite to the facing surface of the first nozzle ring 45 (in the link chamber 65). Instead, the link mechanism 67 may be provided on the side of the surface opposite to the facing surface of the second nozzle ring 57 (on the left side surface side).

A driving shaft 79 is provided on the left side portion of the bearing housing 3, via a bush 81. The driving shaft 79 is rotatable around a shaft core (a shaft core of the driving shaft 79) parallel to the shaft core of the turbine wheel 31. One end portion (right end portion) of the driving shaft 79 is connected to the rotary actuator 71 via a power transmission mechanism 83. Furthermore, a base end portion of a driving link member 85 is integrally connected to the other end portion (left end portion) of the driving shaft 79. A distal end portion of the driving link member 85 is engaged with the engaging concave portion 75 of the driving ring 69.

As illustrated in FIGS. 1, 2, 4, 5A and 5B, a support ring 87 as an annular support member is provided on the surface (right side surface) opposite to the facing surface of the first nozzle ring 45. An outer diameter of the support ring 87 is larger than an outer diameter of the first nozzle ring 45. In addition, an inner edge portion of the support ring 87 is connected to the first nozzle ring 45 through being coupled by swaging of one end portions (right end portions) of the plurality of connecting pins 59. Furthermore, a plurality of connecting pieces 89 is formed at intervals in a circumferential direction (a circumferential direction of the support ring 87) on the inner edge portion of the support ring 87. Each of the connecting pieces 89 protrudes to an inner side in the radial direction. A pin hole 91 is penetrated and formed in each of the connecting pieces 89. A right end portion of the connecting pin 59 is inserted and fitted into the pin hole 91. As a result, the support ring 87 is connected to the first nozzle ring 45. Furthermore, an outer edge portion of the support ring 87 is attached to the bearing housing 3 in a state of being sandwiched by the bearing housing 3 and the turbine housing 29. The outer edge portion of the support ring 87 is allowed to be displaced (slightly moved) in the radial direction with respect to the bearing housing 3. Note that, in this embodiment, the outer edge portion of the support ring 87 is attached to the bearing housing 3 in the state of being sandwiched by the bearing housing 3 and the turbine housing 29. Instead, the outer edge portion of the support ring 87 may be attached to the bearing housing 3 by a mounting bolt (not shown).

As illustrated in FIGS. 1, 2, 3A and 3B, the first nozzle ring 45 is constituted by three nozzle ring segments SG as wall member segments laminated along the axial direction (thickness direction of the first nozzle ring 45). The first nozzle ring 45 is constituted by two nozzle ring segments SG1 and SG2 on a side far from the bearing housing 3 (a side close to the variable nozzle 61) and a nozzle ring segment SG3 on a side the closest to the bearing housing 3. Note that the nozzle ring segment SG1 is farther from the bearing housing 3 than the nozzle ring segment SG2. Namely, the nozzle ring segment SG2 is located between the nozzle ring segment SG1 and the nozzle ring segment SG3. The nozzle ring segment SG3 includes the aforementioned fitting protruding portion 47. Furthermore, a thickness (a length in the axial direction) of each of the nozzle ring segments is large in the order of the nozzle ring segment SG1, the nozzle ring segment SG2, and the nozzle ring segment SG3. Conversely, the nozzle ring segment SG1 is thinner than the nozzle ring segment SG2, and the nozzle ring segment SG2 is thinner than the nozzle ring segment SG3. Such thickness setting of the three nozzle ring segments SG (SG1, SG2, SG3) is based on a new finding that a thickness of a portion having a high temperature in the first nozzle ring 45 is smaller than a thickness of a portion having a low member temperature during a normal operation of the turbocharger 1 (refer to an example which will be described later). Here, the thickness of the nozzle ring segment SG refers to an average thickness of the nozzle ring segments SG in a case where the thicknesses of the nozzle ring segments SG are not constant.

A linear expansion coefficient of a constituent material of the nozzle ring segment SG1 is smaller than the linear expansion coefficient of the constituent material of the nozzle ring segment SG2. Furthermore, the linear expansion coefficient of the constituent material of the nozzle ring segment SG2 is smaller than the linear expansion coefficient of the constituent material of the nozzle ring segment SG3. Namely, the linear expansion coefficients of the constituent materials of the nozzle ring segments SG1, SG2, and SG3 are larger in order of arrangement from the turbine housing 29 toward the bearing housing 3. Specifically, for example, martensite stainless steel is used as the constituent material of the nozzle ring segment SG1. A ferrite stainless steel is used as the constituent material of the nozzle ring segment SG2. An austenite stainless steel is used as the constituent material of the nozzle ring segment SG3. In this embodiment, stainless steels having different linear expansion coefficients are used as the constituent materials of the plurality of nozzle ring segments SG. However, other constituent materials may be used for the nozzle ring segments SG1, SG2, and SG3 as long as the constituent materials of the nozzle ring segments SG1, SG2, and SG3 satisfy the aforementioned magnitude relation of the linear expansion coefficients. For example, different kinds of heat resistant alloys may be combined for use.

The number of the nozzle ring segments SG is not limited to 3 indicated in this embodiment. Namely, the number of the nozzle ring segments SG may be 2 or may be 4 or more.

A plurality of pin holes 93 for allowing insertion of the one end portions (right end portions) of the connecting pins 59 is formed in the first nozzle ring 45. The pin holes 93 are provided at intervals in the circumferential direction (the predetermined circumferential direction) and penetrate the first nozzle ring 45. Each of the pin holes 93 is formed in a slotted hole shape extending from the inner edge portion side (an inner circumferential edge portion side) to an outer edge portion side (an outer circumferential edge portion side) of the first nozzle ring 45. Each of the pin holes 93 may extend in the radial direction or may extend in a direction of being inclined to the radial direction. Each of the pin holes 93 may be formed in a round-hole shape.

As illustrated in FIGS. 2, 3, and 5A, a communication passage 95 for communicating the turbine scroll channel 39 and the link chamber 65 with each other is formed on an inner side (an inner circumferential surface side) of the support ring 87. The communication passage 95 is formed in a discontinuous annular shape extending in the circumferential direction of the support ring 87 and is located between the adjacent connecting pieces 89 in the circumferential direction. In other words, a surface side (right side surface side) opposite to the facing surface of the first nozzle ring 45 communicates with the turbine scroll channel 39 via the communication passage 95 and the link chamber 65.

As illustrated in FIGS. 1 and 2, the supporting portion 49 of the bearing housing 3 has a projecting portion 97 on its inner edge portion. The projecting portion 97 is annularly formed and projects to a left direction. A heat-shielding plate 99 is fitted to the projecting portion 97. The heat-shielding plate 99 is annularly formed and shields heat from the turbine wheel 31 side. Furthermore, a fitting stepped portion 101 is formed at an outer edge portion (outer circumferential edge portion) of the heat-shielding plate 99. The fitting stepped portion 101 is formed in an annular shape dented to the inner side in the radial direction from the outer edge portion. The fitting stepped portion 101 is fitted to an inner edge portion of the first nozzle ring 45. Moreover, a disc spring 103 as an example of an urging (pressing) member is provided between the heat-shielding plate 99 and the supporting portion 49 of the bearing housing 3. The disc spring 103 is provided on an outer side of the bearing housing 3 in the radial direction and urges (presses) the fitting stepped portion 101 of the heat-shielding plate 99 to the inner edge portion of the first nozzle ring 45. In addition, a plurality of seal rings 105 as an example of a seal member is provided between the inner circumferential surface of the second nozzle ring 57 and an appropriate position in the turbine housing 29. The seal ring 105 suppresses leakage of the exhaust gas from a side of the surface (the left side surface side) opposite to the facing surface of the second nozzle ring 57.

Subsequently, an action and an effect of the embodiment of the present disclosure will be described.

A flow of the exhaust gas taken in from the gas inlet 37 through the turbine scroll channel 39 from the inlet side of the turbine wheel 31 to the outlet side makes it possible to generate a rotating force by utilizing the pressure energy of the exhaust gas and to rotate the rotor shaft 9 and the compressor wheel 13 integrally with the turbine wheel 31. Accordingly, it is possible to compress the air taken in from the air inlet 19 and to discharge the compressed air from the air discharge port 25 through the diffuser channel 21 and the compressor scroll channel 23, whereby it is possible to supercharge (compress) the air to be supplied to the engine.

During an operation of the turbocharger 1, in a case where an engine speed is high and a flow rate of the exhaust gas is large, the plurality of variable nozzles 61 is synchronously rotated in the forward direction (opening direction) while the link mechanism 67 is operated by the rotary actuator 71, with the result that the passage area (throat area) for the exhaust gas supplied to the turbine wheel 31 side is increased and thus a large amount of the exhaust gas is supplied. On the other hand, in a case where the engine speed is low and the flow rate of the exhaust gas is small, the plurality of variable nozzles 61 is synchronously rotated in the reverse direction (closing direction) while the link mechanism 67 is operated by the rotary actuator 71, with the result that the passage area of the exhaust gas supplied to the turbine wheel 31 side is decreased, a flow velocity of the exhaust gas is increased, and thus workload of the turbine wheel 31 is sufficiently ensured. Accordingly, the rotating force can be sufficiently and stably generated by the turbine wheel 31, regardless of magnitude of the flow rate of the exhaust gas.

The first nozzle ring 45 is constituted by the plurality of nozzle ring segments SG laminated along the axial direction. Accordingly, during the operation of the turbocharger 1, even if a temperature difference between the portion on the side far from the bearing housing 3 in the first nozzle ring 45 and the portion on the side close thereto increases, the temperature difference between the portion on the side far from the bearing housing 3 in each of the nozzle ring segments SG and the portion on the side close thereto can be reduced. As a result, during the operation of the turbocharger 1, prevention of free thermal expansion in the radial direction of each of the nozzle ring segments SG, or in other words, the free thermal expansion of the first nozzle ring 45 in the radial direction can be suppressed.

For example, in a case where each of the pin holes 93 of the first nozzle ring 45 is constituted in a slotted hole shape extending from the inner edge portion side toward the outer edge portion side of the first nozzle ring 45, prevention of the free expansion of the first nozzle ring 45 in the radial direction can be sufficiently suppressed. Furthermore, in a case where the thickness of the nozzle ring segment SG1 is smaller than the thickness of the nozzle ring segment SG2 and the thickness of the nozzle ring segment SG2 is smaller than the thickness of the nozzle ring segment SG3, in consideration of the aforementioned new finding, the temperature difference between the portion on the side far from the bearing housing 3 and the portion on the side close thereto in each of the nozzle ring segments SG can be made as small as possible while an increase in the number of segments of the nozzle ring segments SG is suppressed. In other words, the prevention of the free thermal expansion of the first nozzle ring 45 in the radial direction can be sufficiently suppressed while the increase in the number of segments of the nozzle ring segments SG is suppressed. Furthermore, in a case where the linear expansion coefficients of the constituent materials of the three nozzle ring segments SG are set as above, for example, a difference in the thermal expansion of the three nozzle ring segments SG in the radial direction can be made as small as possible, and prevention of the free thermal expansion of the first nozzle ring 45 in the radial direction can be sufficiently suppressed.

Since the side of the surface opposite to the facing surface of the first nozzle ring 45 communicates with the turbine scroll channel 39, each of the variable nozzles 61 can be brought close to the facing surface side of the second nozzle ring 57 by increasing a pressure working on an end surface of the nozzle shaft 63 of each of the variable nozzles 61, during the operation of the turbocharger 1.

Therefore, according to this embodiment, even when the temperature difference between the portion on the side far from the bearing housing 3 and the portion on the side close thereto in the first nozzle ring 45 is increased during the operation of the turbocharger 1, prevention of the free thermal expansion of the first nozzle ring 45 in the radial direction can be sufficiently suppressed. Accordingly, thermal deformation of the first nozzle ring 45 can be sufficiently suppressed so that the facing surface of the first nozzle ring 45 is inclined to a direction perpendicular to the axial direction. As a result, the nozzle-side clearance can be made as small as possible while parallelism between the facing surface of the first nozzle ring 45 and the facing surface of the second nozzle ring 57 is sufficiently ensured. Therefore, according to this embodiment, while stability of the operations of the plurality of variable nozzles 61 is maintained and reliability of the variable nozzle unit 43, in other words, reliability of the turbocharger 1 is ensured, a leakage flow from the nozzle-side clearance can be reduced and turbine efficiency of the turbocharger 1 can be enhanced.

Furthermore, the nozzle-side clearance can be made as small as possible. In other words, during the operation of the turbocharger 1, each of the variable nozzles 61 can be brought close to the facing surface side of the second nozzle ring 57. Accordingly, a leakage flow from the clearance between the left side surface of each of the variable nozzles 61 and the facing surface of the second nozzle ring 57 can be suppressed, the flow of the exhaust gas along the tip 35t side portion (portion from a mid span side to the tip 35t side) of the turbine blade 35 can be made stable, and the turbine efficiency of the turbocharger 1 can be further enhanced.

Furthermore, since prevention of the free thermal expansion of the first nozzle ring 45 in the radial direction can be sufficiently suppressed while the increase in the number of segments in the nozzle ring segments SG is suppressed, simplification of the configuration of the variable nozzle unit 43 and enhancement of assembling performance can be achieved while the increase in the number of components of the variable nozzle unit 43 is suppressed.

Note that the present disclosure is not limited to the explanation of the aforementioned embodiment but can be carried out in various modes. In addition, the scope of the right included in the present disclosure is not limited to these embodiments.

EXAMPLE

Figure 7:
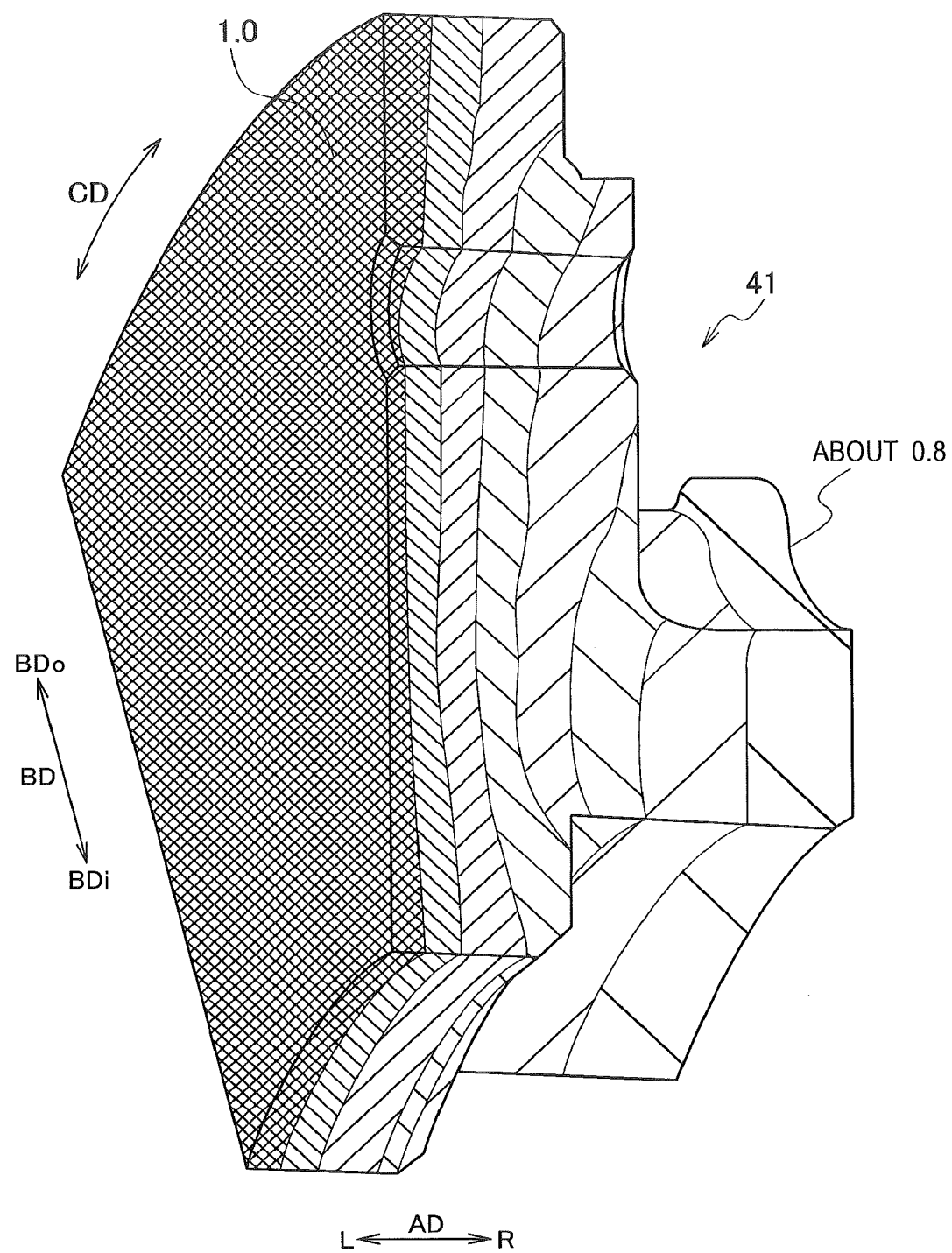
FIG. 7 is a perspective view illustrating a temperature distribution state of a portion of the first nozzle ring during a normal operation of the variable geometry system turbocharger.

Analysis of heat transfer (heat transfer analysis) was conducted on a temperature distribution state of the first nozzle ring 45 during the operation of the turbocharger 1 (see FIG. 6), and the analysis result is shown in FIG. 7. Namely, it was found that during the operation of the turbocharger 1, the thickness of the portion having a high member temperature in the first nozzle ring 45 tends to be smaller than the thickness of the portion having a low member temperature.

Note that a numerical value 0.8 in FIG. 7 indicates a temperature of the end surface (support ring side end surface) on the side close to the bearing housing 3 in the first nozzle ring 45, assuming that the temperature of the end surface (nozzle side end surface) on the side far from the bearing housing 3 (see FIG. 6) in the first nozzle ring 45 is 1.0. Furthermore, each of regions partitioned by different types of hatching in FIG. 7 indicates a region with the same temperature difference, and the temperature difference between the adjacent regions is approximately 0.025 in the aforementioned case. Furthermore, the numerical values in FIG. 7 are reference values for exhibiting a tendency of the temperature distribution state of the first nozzle ring 45.

What is claimed is:

1. A variable nozzle unit varying an exhaust gas from an engine to be supplied to a turbine wheel in a variable geometry system turbocharger, the variable nozzle unit comprising:
    an annular wall member provided concentrically with the turbine wheel in a turbine housing in the variable geometry system turbocharger;
    a plurality of variable nozzles provided at intervals on the annular wall member in a circumferential direction and rotatable in a forward-reverse direction;
    a link mechanism for synchronously rotating the plurality of the variable nozzles; and
    a support ring connected to the annular wall member, wherein
    the annular wall member is constituted by a plurality of wall member segments laminated along an axial direction, and
    the plurality of the wall member segments has thicknesses being thicker in order of an arrangement from a side of the plurality of wall member segments close to the plurality of the variable nozzles toward a side of the plurality of wall member segments farther from the plurality of the variable nozzles.

2. A variable geometry system turbocharger comprising:
    a compressor for supercharging air to be supplied to an engine;
    a turbine being driven by an exhaust gas from the engine; and
    a variable nozzle unit varying the exhaust gas passing through a passage area of the turbine, the variable nozzle unit including:
        an annular wall member provided concentrically with the turbine wheel in a turbine housing in the variable geometry system turbocharger;
        a plurality of variable nozzles provided at intervals on the annular wall member in a circumferential direction and rotatable in a forward-reverse direction;
        a link mechanism for synchronously rotating the plurality of the variable nozzles; and
        a support ring connected to the annular wall member, wherein
        the annular wall member is constituted by a plurality of wall member segments laminated along an axial direction, and
        the plurality of the wall member segments has thicknesses being thicker in order of an arrangement from a side of the plurality of wall member segments close to the plurality of the variable nozzles toward a side of the plurality of wall member segments farther from the plurality of the variable nozzles.

3. A variable nozzle unit that adjusts a passage area of an exhaust gas from an engine to be supplied to a turbine wheel in a variable geometry system turbocharger, the variable nozzle unit comprising:
    an annular first wall member provided concentrically with the turbine wheel in a turbine housing in the variable geometry system turbocharger;
    an annular second wall member provided integrally with the annular first wall member by a plurality of connecting pins aligned at intervals in a circumferential direction at a position separated from and facing the annular first wall member in an axial direction;
    a plurality of variable nozzles provided at the intervals in the circumferential direction between a facing surface of the annular first wall member and a facing surface of the annular second wall member and rotatable in a forward-reverse direction around a shaft core parallel to a shaft core of the turbine wheel;
    a link mechanism for synchronously rotating the plurality of the variable nozzles; and
    a support ring integrally connected to the annular first wall member by connecting one end portion of the plurality of the connecting pins, wherein
    the annular first wall member is constituted by a plurality of wall member segments laminated along the axial direction, and
    the plurality of the wall member segments has thicknesses being thicker in order of an arrangement from a side of the plurality of wall member segments close to the plurality of the variable nozzles toward a side of the plurality of wall member segments farther from the plurality of the variable nozzles.

4. The variable nozzle unit according to claim 3, wherein a linear expansion coefficient of a constituent material of one of the plurality of the wall member segments on the side close to the plurality of the variable nozzles is less than a linear expansion coefficient of a constituent material of one of the plurality of the wall member segments on the side far from the plurality of the variable nozzles.

5. The variable nozzle unit according to claim 4, wherein
a plurality of pin holes for allowing insertion of the one end portion of the connecting pins is penetrated and formed at the intervals in the circumferential direction in the annular first wall member; and
each of the plurality of the pin holes of the annular first wall member is formed in a slotted hole shape extending from an inner edge portion side toward an outer edge portion side of the annular first wall member.

6. The variable nozzle unit according to claim 5, wherein
a plurality of support holes is penetrated and formed at intervals in a circumferential direction in the annular first wall member;
a nozzle shaft of each of the variable nozzles is rotatably supported by one of the plurality of the support holes corresponding to the annular first wall member; and
a side of a surface opposite to the facing surface of the annular first wall member communicates with a turbine scroll channel of the turbine housing.

7. The variable nozzle unit according to claim 4, wherein
a plurality of support holes is penetrated and formed at intervals in a circumferential direction in the annular first wall member;
a nozzle shaft of each of the variable nozzles is rotatably supported by one of the plurality of the support holes corresponding to the annular first wall member; and
a side of a surface opposite to the facing surface of the annular first wall member communicates with a turbine scroll channel of the turbine housing.

8. The variable nozzle unit according to claim 3, wherein
a plurality of pin holes for allowing insertion of the one end portion of the connecting pins is penetrated and formed at the intervals in the circumferential direction in the annular first wall member; and
each of the plurality of the pin holes of the annular first wall member is formed in a slotted hole shape extending from an inner edge portion side toward an outer edge portion side of the annular first wall member.

9. The variable nozzle unit according to claim 8, wherein
a plurality of support holes is penetrated and formed at intervals in a circumferential direction in the annular first wall member;
a nozzle shaft of each of the variable nozzles is rotatably supported by one of the plurality of the support holes corresponding to the annular first wall member; and
a side of a surface opposite to the facing surface of the annular first wall member communicates with a turbine scroll channel of the turbine housing.

10. The variable nozzle unit according to claim 3, wherein
a plurality of support holes is penetrated and formed at intervals in a circumferential direction in the annular first wall member;
a nozzle shaft of each of the variable nozzles is rotatably supported by one of the plurality of the support holes corresponding to the annular first wall member; and
a side of a surface opposite to the facing surface of the annular first wall member communicates with a turbine scroll channel of the turbine housing.

11. A variable geometry system turbocharger comprising:
a compressor for supercharging air to be supplied to an engine,
a turbine being driven by an exhaust gas from the engine; and
a variable nozzle unit adjusting the exhaust gas passing a passage area of the turbine, the variable nozzle unit including:
an annular first wall member provided concentrically with the turbine wheel in a turbine housing in the variable geometry system turbocharger;
an annular second wall member provided integrally with the annular first wall member by a plurality of connecting pins aligned at intervals in a circumferential direction at a position separated from and facing the annular first wall member in an axial direction;
a plurality of variable nozzles provided at the intervals in the circumferential direction between a facing surface of the annular first wall member and a facing surface of the annular second wall member and rotatable in a forward-reverse direction around a shaft core parallel to a shaft core of the turbine wheel;
a link mechanism for synchronously rotating the plurality of the variable nozzles; and
a support ring integrally connected to the annular first wall member by connecting one end portion of the plurality of the connecting pins,
wherein
the annular first wall member is constituted by a plurality of wall member segments laminated along the axial direction, and
the plurality of the wall member segments has thicknesses being thicker in order of an arrangement from a side of the plurality of wall member segments close to the plurality of the variable nozzles toward a side of the plurality of wall member segments farther from the plurality of the variable nozzles.

* * * * *